United States Patent
Lee et al.

(10) Patent No.: US 10,742,440 B2
(45) Date of Patent: Aug. 11, 2020

(54) METHOD AND SYSTEM OF CONTROLLING DEVICE USING REAL-TIME INDOOR IMAGE

(71) Applicant: Hanwha Techwin Co., Ltd., Seongnam-si (KR)

(72) Inventors: Ho Jung Lee, Seongnam-si (KR); Mi Ran Cho, Seongnam-si (KR); Yeon Woo Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/118,904

(22) Filed: Aug. 31, 2018

(65) Prior Publication Data

US 2019/0068393 A1 Feb. 28, 2019

(30) Foreign Application Priority Data

Aug. 31, 2017 (KR) .......................... 10-2017-0111008

(51) Int. Cl.
*H04L 29/08* (2006.01)
*H04L 12/28* (2006.01)
(Continued)

(52) U.S. Cl.
CPC .......... *H04L 12/282* (2013.01); *G06F 3/0481* (2013.01); *G06F 3/0488* (2013.01); *G06F 3/04847* (2013.01); *G06F 3/167* (2013.01); *G06K 9/3241* (2013.01); *G06K 9/6253* (2013.01); *H04L 67/12* (2013.01);
(Continued)

(58) Field of Classification Search
CPC ....... H04L 12/282; H04L 67/36; H04L 67/12; H04L 2012/2841; G06T 17/10; G06K 9/6253; G06K 9/20; G06K 9/3241; G06F 3/04883; G06F 3/04847; G06F 3/04842; G06F 3/167
See application file for complete search history.

(56) References Cited

U.S. PATENT DOCUMENTS

2016/0174043 A1* 6/2016 Ko ........................ H04W 4/023
455/456.1
2017/0034468 A1* 2/2017 Won ...................... H04N 5/4403
(Continued)

FOREIGN PATENT DOCUMENTS

KR  10-0575447 B1  5/2006
KR  10-0800998 B1  2/2008

*Primary Examiner* — Rinna Yi
(74) *Attorney, Agent, or Firm* — Sughrue Mion, PLLC

(57) ABSTRACT

A device and a method for controlling a device using a real-time image are provided. The method includes: receiving an image captured by an image capturing device connected to a network to display the image in real-time; searching for the device that is connected to the network and is controllable; designating, within the image, a setting zone corresponding to the device; receiving a user input; and controlling the device selected according to the user input. A location of the setting zone within the image may be updated according to a change in the image. The user may receive immediate visual feedback on how the devices are being controlled. The user may control a device displayed on the screen on which the real-time indoor image is displayed without having to navigate through different sub-menus for different devices.

12 Claims, 16 Drawing Sheets

(51) Int. Cl.
*G06K 9/62* (2006.01)
*G06F 3/0484* (2013.01)
*G06F 3/16* (2006.01)
*G06K 9/32* (2006.01)
*G06F 3/0481* (2013.01)
*G06F 3/0488* (2013.01)
*G06T 17/10* (2006.01)
*H04L 29/06* (2006.01)

(52) U.S. Cl.
CPC .......... *H04L 67/36* (2013.01); *G06F 3/04842* (2013.01); *G06F 3/04883* (2013.01); *G06T 17/10* (2013.01); *H04L 67/38* (2013.01); *H04L 2012/2841* (2013.01)

(56) References Cited

U.S. PATENT DOCUMENTS

2017/0185276 A1* 6/2017 Lee .................... G06F 3/04847
2018/0018786 A1* 1/2018 Jakubiak ............... G06T 3/4053

* cited by examiner

FIG. 3
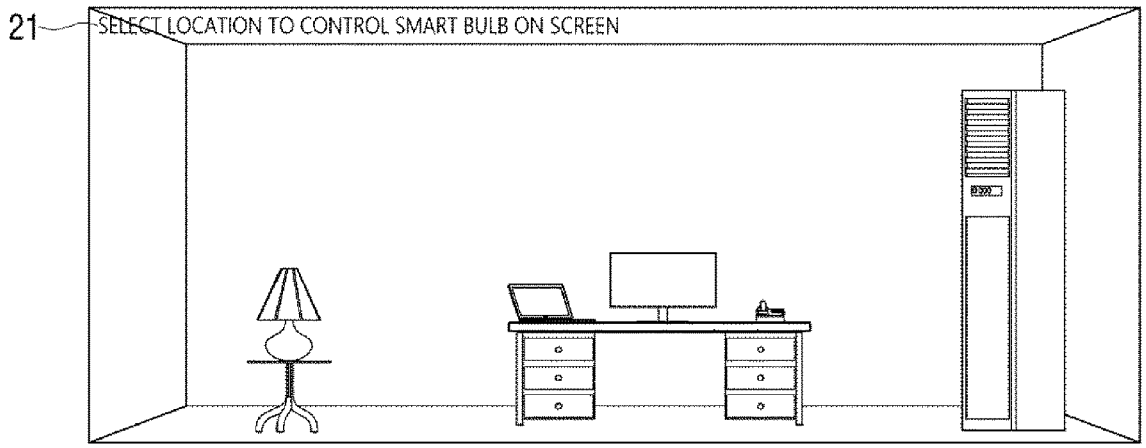
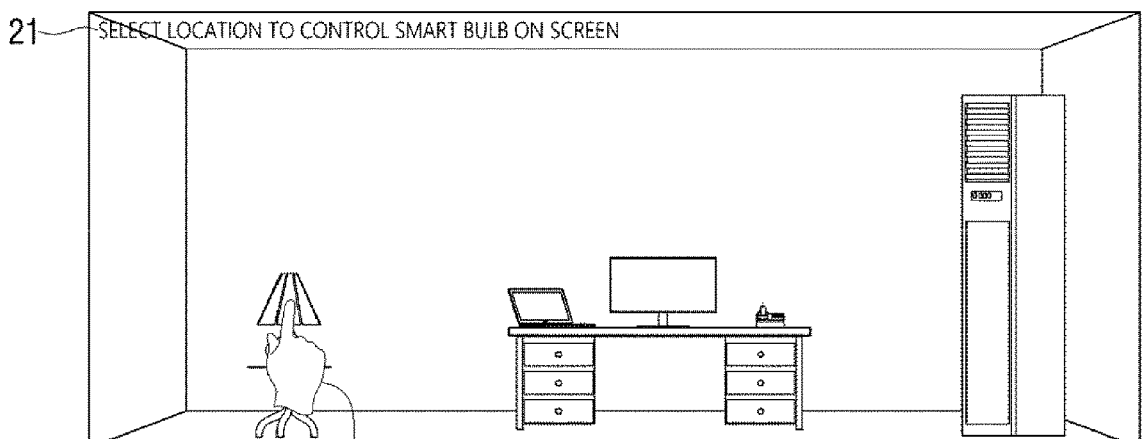
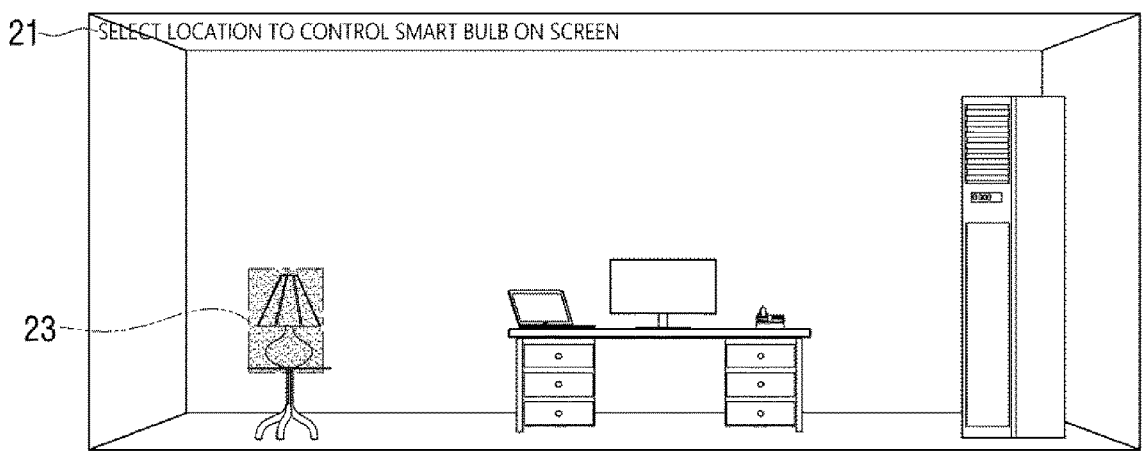

FIG. 6
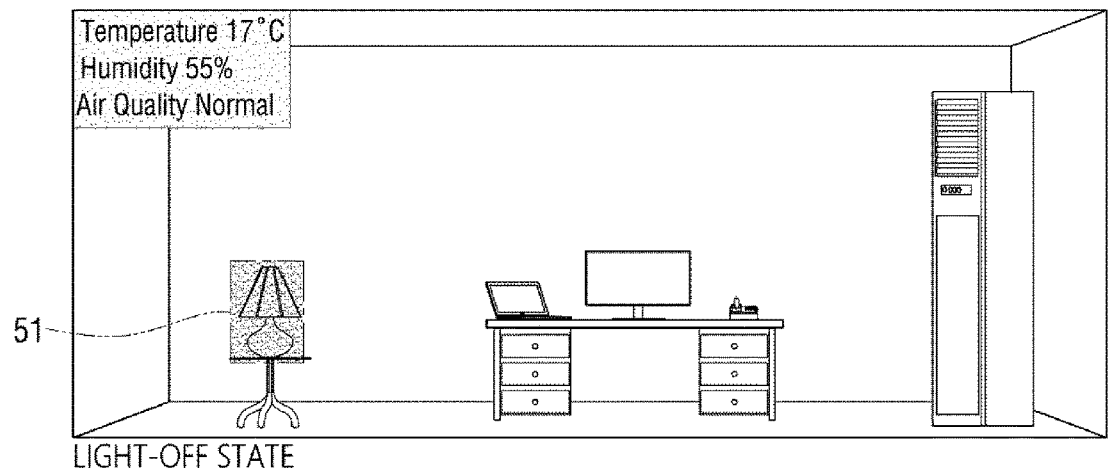
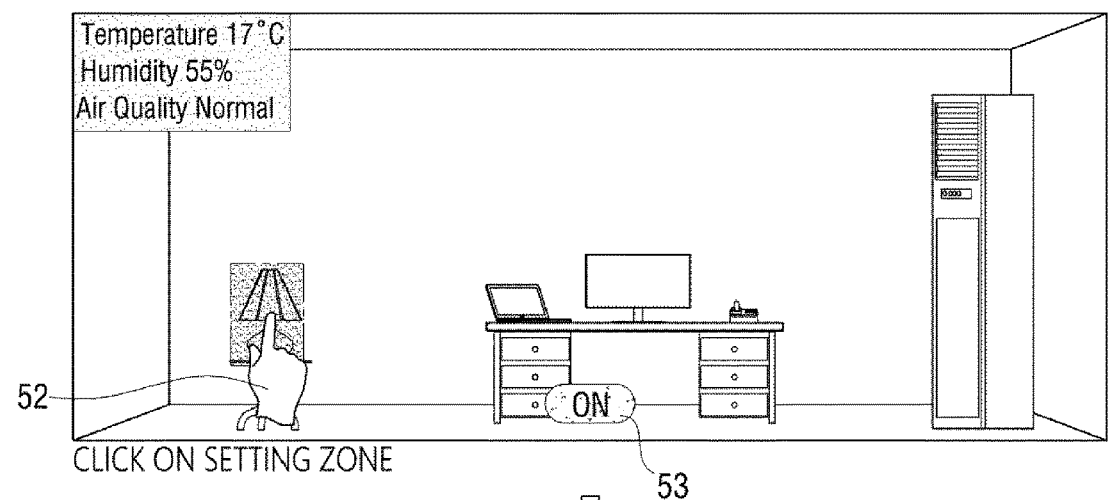
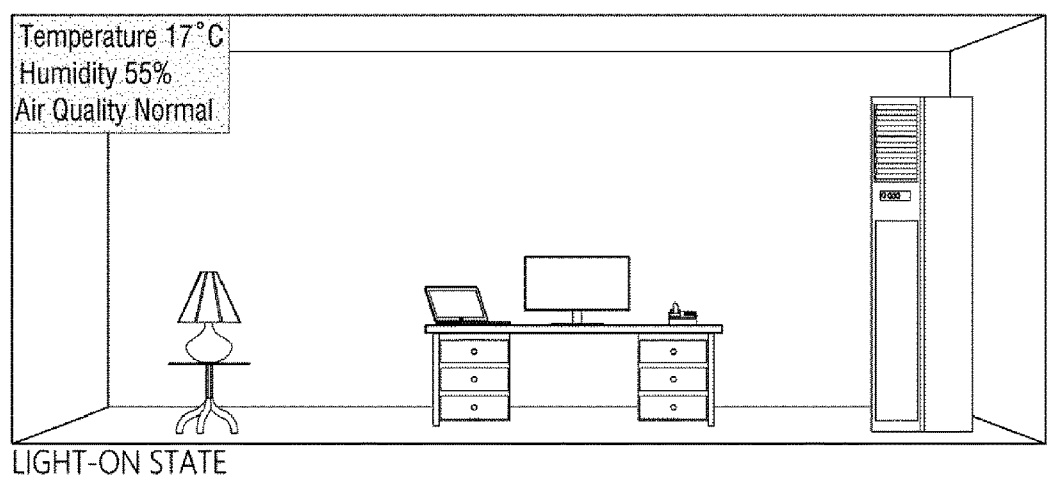

FIG. 13
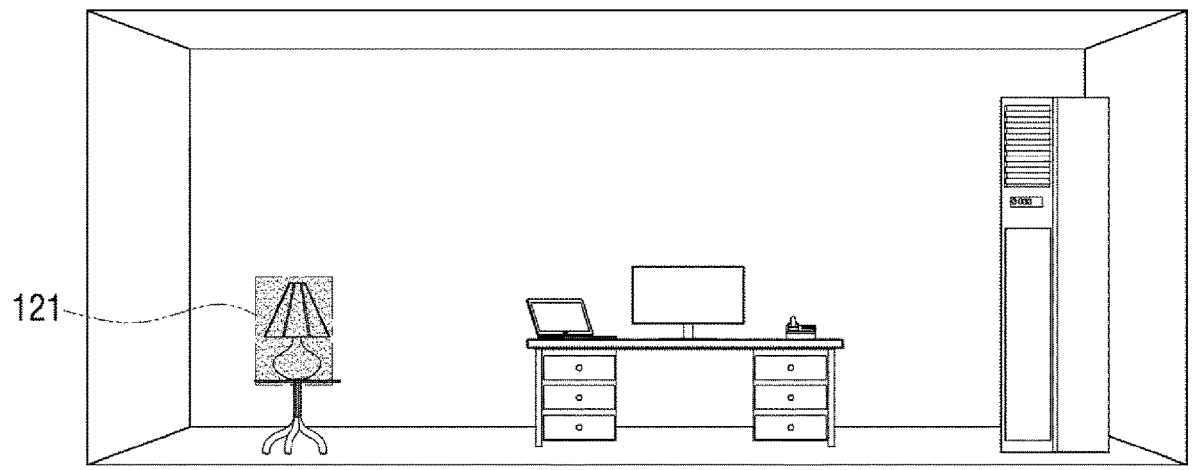
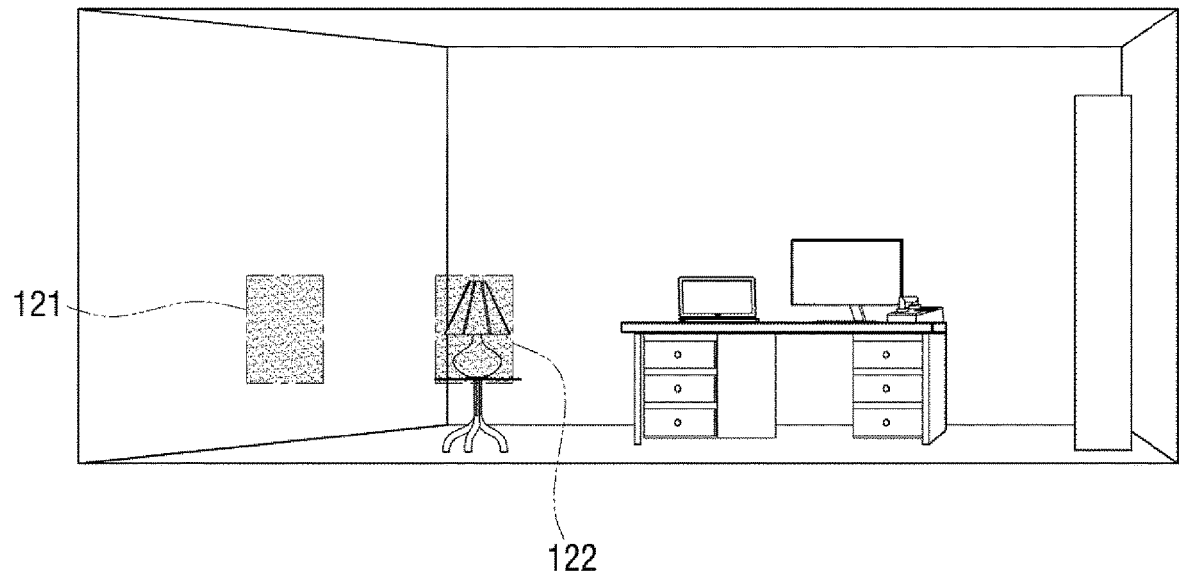

METHOD AND SYSTEM OF CONTROLLING DEVICE USING REAL-TIME INDOOR IMAGE

CROSS-REFERENCE TO THE RELATED APPLICATION

This application claims priority from Korean Patent Application 10-2017-0111008 filed on Aug. 31, 2017 in the Korean Intellectual Property Office, the disclosure of which is incorporated herein by reference in its entirety.

BACKGROUND

1. Field

The present disclosure relates to a method of controlling a device, and a system for controlling a device, and more particularly, to a method of controlling a display device, and a system for controlling a device using a real-time image.

2. Description of the Related Art

Home automation refers to the automatic control and management of various facilities and electronic appliances at home by utilizing indoor devices and computer systems that are connected with the Internet of Things (IoT). With the introduction of home automation, it is possible to control a plurality of indoor devices with a single remote controller in the room. Further, it is possible to control the indoor devices from a remote location in communications over a wireless network.

FIG. 1 shows an existing home automation system. In FIG. 1, icons for controlling indoor devices are displayed on a touch screen. Previously, in order to control a device, a user would have to select an icon and then submenus for controlling the device would be displayed, so that the user may control the device. However, it is cumbersome to select from different menus for controlling different indoor devices, and it is inconvenient since the user cannot monitor the statuses of the controlled indoor devices in real time.

In the related art, a plan view or a picture of a house may be displayed on a touch screen, and icons of home appliances may be generated and displayed on the touch screen. The icons displayed on touch screen may be placed in the plan view of the house according to a user's command. When the user selects an icon by touching the touch screen, a home appliance associated with the icon may be identified and controlled (as disclosed in Korean Patent No. 10-0575447).

In such plan view of the house, however, the user could not see how a home appliance is being controlled in real time. Additionally, referring to FIG. 7 of Korean Patent No. 10-0575447, the walls are represented in the plan view of the house, and accordingly a user may not recognize home appliances placed behind the walls. In addition, the plan view of the house where furniture and home appliances are placed has to be updated whenever the furniture or the home appliances are physically moved, which is cumbersome.

In view of the above, what is needed is a home automation system that allows a user to monitor the statuses of the indoor devices in real time without requiring the user to navigate through different submenus for different devices.

SUMMARY

Aspects of the present disclosure provide a method and system of controlling a device without having to enter different sub-menus for different devices.

Aspects of the present disclosure also provide a method and system of controlling a device that allows a user to receive immediate visual feedback on how a device is being controlled.

It should be noted that objects of the present disclosure are not limited to the above-mentioned object; and other objects of the present invention will be apparent to those skilled in the art from the following descriptions.

According to an aspect of the present disclosure, there is provided a method of controlling a device. The method may include: receiving an image captured by an image capturing device connected to a network to display the image in real time; searching for the device that is connected to the network and is controllable; designating, within the image, a setting zone corresponding to the device; receiving a user input; and controlling the device selected according to the user input. A location of the setting zone within the image may be updated according to a change in the image.

Other particulars of the present disclosure will be described in the detailed description with reference to the accompanying drawings.

According to exemplary embodiments of the present disclosure, at least following effects may be achieved:

According to an exemplary embodiment of the present disclosure, it is possible for a user to monitor the status of a device immediately (e.g., in real time) and to control the device. That is to say, it is possible to provide a more intuitive device control system to the user.

In addition, according to an exemplary embodiment of the present disclosure, the user may control a device on the screen on which the indoor image is displayed without having to navigate through different sub-menus for different devices.

Furthermore, for a device in which a network error occurs frequently, it is possible to receive immediate feedback on the screen on how the device is operating, and thus to monitor that it is operating properly.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which:

FIG. 3 shows a method of registering a setting zone for controlling a smart light bulb;

FIGS. 6 and 7 illustrate a method of controlling a smart light bulb when a user's touch input is a tap;

FIG. 13 shows a method of adjusting the coordinates of the setting zone in accordance with the movement of the camera;

DETAILED DESCRIPTION OF THE EXEMPLARY EMBODIMENTS

Figure 1:
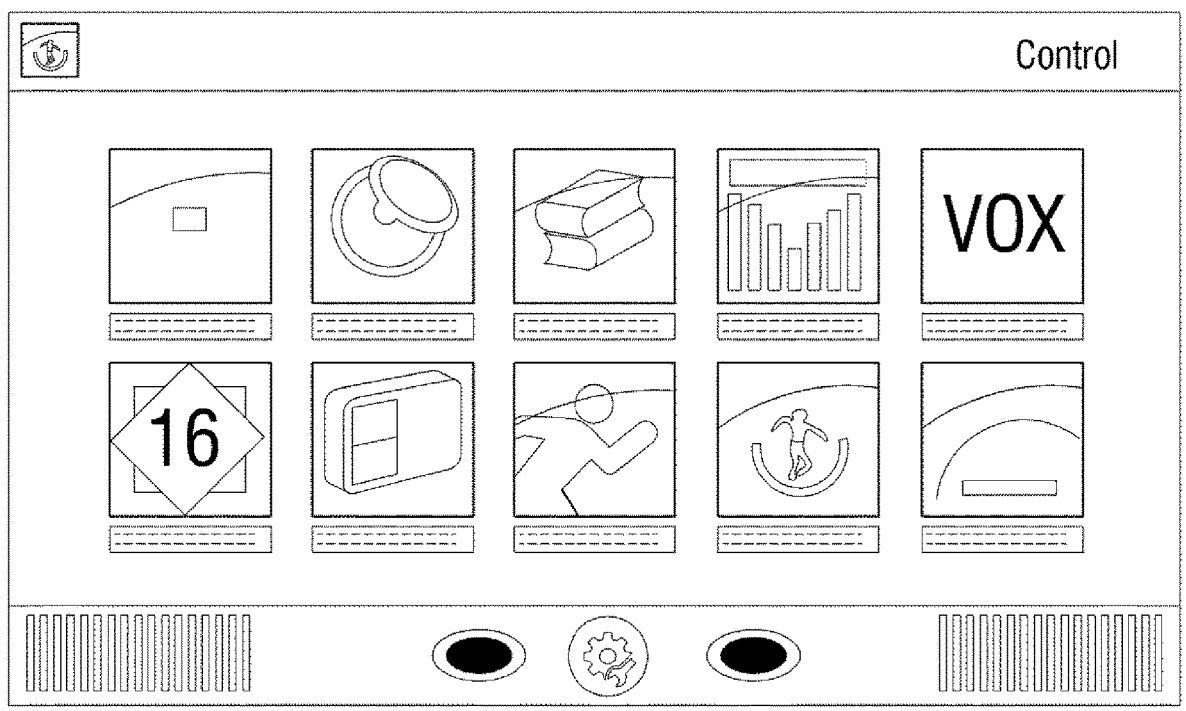
FIG. 1 shows a device control system according to related arts.

Reference will now be made in detail to exemplary embodiments, with reference to the accompanying drawings. In the drawings, parts irrelevant to the description are omitted to clearly describe the exemplary embodiments, and like reference numerals refer to like elements throughout the specification. In this regard, the present exemplary embodiments may have different forms and should not be construed as being limited to the descriptions set forth herein.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings. The word "exemplary" is used herein to mean "serving as an example or illustration." Any aspect or design described herein as "exemplary" is not necessarily to be construed as preferred or advantageous over other aspects or designs.

Figure 2:
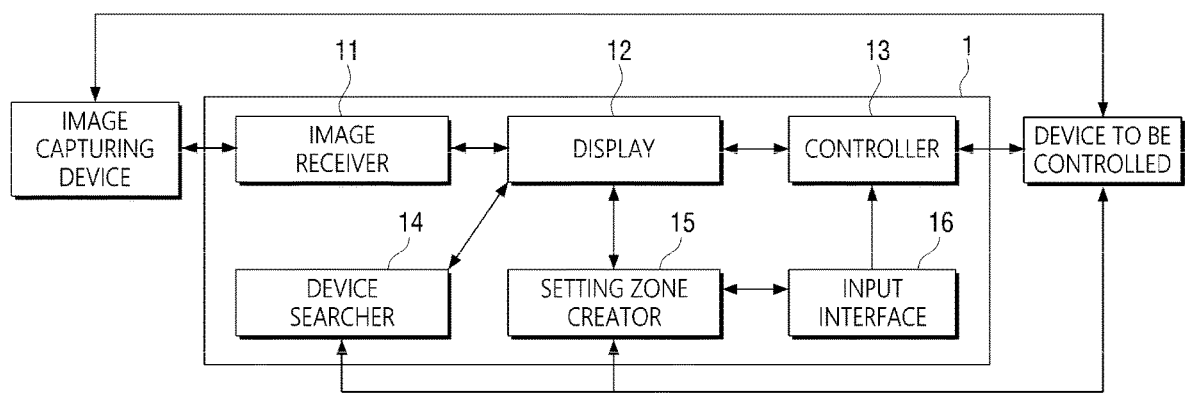
FIG. 2 is a block diagram of a device control system according to an exemplary embodiment of the present disclosure.

FIG. 2 shows a device control system 1 according to an exemplary embodiment of the present disclosure. According to the exemplary embodiment of the present disclosure, the device control system 1 includes an image receiver 11, a display 12, a controller 13, a device searcher 14, an input interface 16, and a setting zone creator 15. The device control system 1 may further include a mapper, a matcher, a network, an information display, or an object recognizer. The various components, units and modules shown in FIG. 2 and other figures may be implemented with hardware (e.g., circuits, microchips, processors, etc.), software (e.g., instructions, commands, programs, applications, firmware, etc.), or a combination of both hardware and software.

The device control system 1 according to the exemplary embodiment of the present disclosure may be a home automation system and may control devices placed indoors by using a real-time indoor image acquired from a camera used as an image capturing device.

The image capturing device may be a camera or an image sensor capable of capturing images. The image capturing device may be connected to a network. The devices to be controlled may be connected to the network. By using the real-time image from the image capturing device connected to the same network as the devices to be controlled, it is possible to efficiently receive the information of the devices to be controlled and the image or to efficiently control the devices including the image capturing device. Accordingly, it is possible to prevent an error that may arise when data is transmitted/received over different networks or connections due to by a difference between the networks. In addition, information or images of devices can be integrated and transmitted from a single device or server connected over a network, allowing for various network configurations.

The image capturing device may capture an image of, but is not limited to, an indoor space. It is to be understood that the image capturing device may capture an image of any location where the device to be controlled is located. In the following description, the image capturing device captures an image of a room as an example.

The image receiver 11 receives a real-time indoor image from the image capturing device (e.g., a camera). The image receiver 11 may receive the real-time indoor image via wired communications or wireless communications. In addition, the image receiver 11 may receive the real-time indoor image directly from the camera or may receive the image from a server after it is transmitted from the camera to the server.

Additionally, when the camera has the capability of measuring the indoor environments such as temperature and humidity, the image receiver 11 can receive the measured information together with the real-time indoor image.

The display 12 displays the real-time indoor image received through the image receiver 11. When the display 12 is implemented as a touch screen, it can display an indoor image and receive input from a user. The display 12 may display a real-time indoor image fully on the screen or may display a real-time indoor image on a predetermined part of the screen while displaying icons used for controlling the indoor devices, etc. in the other part thereof.

The input interface 19 receives the user's input. It may receive the user's touch input or voice. The input interface 19 may receive an input from a mouse, a keyboard, a microphone, a camera, etc. The input interface 19 may receive an input via another input device such as a keyboard and a mouse or may receive an input by way of gesture recognition or the like. When the display 12 is implemented as a touch screen, the input interface 19 may receive a touch input on the touch screen from the user. The input interface 19 may include a voice recognizer for analyzing the user's voice when the user's voice is received and identifying the user's command. By recognizing the user's voice, a selection command for selecting one from among the devices and a control command for controlling the selected device may be identified. Alternatively, a control command may be identified without the user specifically selecting a device, and a device that is to perform the derived control command may be identified. For example, a selection command for selecting a light (e.g., a light fixture) may be derived by analyzing a user's utterance of "light," "select light," or the like. Similar to the selection command, a control command for controlling the light may be identified by analyzing the user's utterance such as "turn on the light," "change the color," or the like. Alternatively, a control command for the light may be derived even without selecting the light by directly analyzing the utterance of "turn off the light."

A user may make an input by touching the screen with a finger, which hereinafter is referred to as a touch input. The touch input may include a tap gesture of a user touching the screen with a single finger for a short period of time, a long press gesture (also known as a tap-and-hold gesture) of a user touching the screen with a single finger for a long period of time (e.g., longer than a threshold time duration) and a multi-touch gesture of a user touching the screen with two or more fingers simultaneously.

When the user's touch input received by the input interface 19 falls within a setting zone associated with an indoor device in the image displayed on the display 12, the controller 13 generates a control signal for controlling the device. The setting zone refers to an area (e.g., a hotspot) on the display 12 designated by the user for controlling a specific device that is mapped to the area. The location of the setting zone of an indoor device to be controlled on the screen may be either the same as or different from the location of the indoor device on the screen.

The controller 13 may generate a control signal for controlling an indoor device upon receiving a user's touch input. For example, when a click gesture is input on the touch screen, the controller 13 may generate a control signal for switching an indoor device from the on-state to the off-state or vice versa. Alternatively, when a multi-touch gesture is input on the touch screen, the controller 13 may generate a control signal for switching a plurality of devices from the on-state to the off-state or vice versa. The controller 13 may be a processor, a central processing unit (CPU), an application processor (AP), etc.

The device searcher 14 searches for devices that can be controlled by the controller 13. A device to be searched for may be a device located in the area captured by the image capturing device or may be a device connected to the image capturing device over the network. The device may be discovered by searching for the network. Alternatively, the device may be searched for by performing object recognition on the received image.

The setting zone creator 15 may set (e.g., define, assign, designate, etc.) a setting zone for the discovered devices. In order to select a device to be controlled from the image, a setting zone may be set to select an area where the device is placed. The setting zone may be set upon receiving a user's input or by performing object recognition in the image. Alternatively, the setting zone may be set by using the location of the device which is identified through data transmission/reception over the network.

The user may interact with the user interface more intuitively when the zone is defines as the location of the device. The setting zone may be set in the shape of the device identified in the image or may be set to have a size including all or part of the shape of the device. If the setting zone is too small or too large, it may be difficult to select the device or it may obstruct the selection of another device. Accordingly, the setting zone may have a predetermined size. Alternatively, the position, shape and size of the setting zone may be adjusted by the user.

The setting zone creator 15 determines whether the discovered device is recognized in the image. If such a case, the location of the display device in the image is set as the setting zone of the device. In other cases, any location of the device in the image that does not overlap with the setting zones of other devices may be set as the setting zone of the device.

The devices displayed in the image may be extracted by performing object recognition. The areas associated with the locations of the devices extracted by object recognition may be set as the setting zones of the extracted devices. Alternatively, the information on the devices extracted by the object recognition may be indicated on the display 12 and provided to the user, and to query whether or not to set the setting zones for the devices. In addition, the setting zone creator 15 may set a setting zone for selecting a device not identified in the image. If a device is not identified in the image depending on the capturing angle or range (e.g., field of view) of the camera, or a device is located outside the room, an arbitrary (e.g., randomly chosen) area may be set as the setting zone for the device. Candidate areas for the setting zone of the device may be displayed on the display 12 so that the user can select an area among them.

The location of the setting zone within the image may be changed (e.g., updated) according to the change of the image. The change in the image may include a change in the angle of view of the image or a change in the location of a device within a given angle of view. The angle of view of the image capturing device may be changed according to panning, tilting and zooming (PTZ) control of the image capturing device or a device to be controlled may be movable like a cleaning robot (e.g., a robot vacuum cleaner) or the shape may vary, as well as when the image capturing device captures an image with the same angle of view or a device to be controlled is stationary. As a result, there may be a change in the image. When the setting zone is set to a location on the image where the device is recognized, the location of the device in the image changes according to the change of the image, and accordingly the setting zone may be changed in position or shape according to the change of the image. If the device moves out of frame from the image due to a change in the image, the setting zone may be moved to a predetermined location for the device. For example, the predetermined location may be a top-left corner or a top-right corner. Alternatively, the display 12 may display areas other than the area of the displayed image. At this time, the setting zone of the device which has moved out of frame from the image may be moved to an area other than the previously designated area of the image. Alternatively, a mini-map for the entire area or a partial area of the capturing range of the image capturing device may be displayed, such that the setting zone may be moved on the mini-map in order to continue to display the setting zone of the device which has moved out of frame from the current image.

The object recognizer may extract a device from the image and recognize it or may track the location of the device in the image. The device may be extracted as the image receiver analyzes the received image and recognizes the object. When the capturing angle or range of the camera is changed by the camera operator, the setting zone in the image may be changed. When this happens, the location of the setting zone with respect to the location of the device changed in the image may be changed by performing object recognition to track the new location. In addition, if the device is a moving device (e.g., a robot vacuum cleaner), the location of the device may be changed according to the operation of the device and the location of the device in the image may be tracked by performing object recognition.

The display 12 may display an image received in real-time by the image receiver to allow the user to monitor the information on the current location and status of the device and receive immediate feedback on how the devices are being operated and controlled. In addition, the display 12 may display at least a part of the setting zone of the device selected upon receiving the user's input on the image. The display 12 may display the setting zone to allow the user to select the setting zone. In addition, the display 12 may indicate at least one piece of information on the device on the setting zone. The information on the device may include identification information, function information, status information indicating an operating status of the device, measurement information indicating a value measured by the device and image information captured by a camera mounted on the device.

When receiving a user's input, if the device selected in accordance with the user's input is not located in the currently displayed image, the controller 13 may control the image capturing device so that the image capturing device captures the device selected in accordance with the user's input while the device is controlled or after the device is controlled. When receiving the user's input, if the device selected in accordance with the user's input is not located in the currently displayed image, the display 12 may display the setting zone of the device on the image while the device is controlled or after the device is controlled. When the device is located in the image, the user may receive immediate feedback on how the device is being operated and controlled. However, if the device is not located on the currently displayed image, the user cannot receive immediate feedback. Therefore, the controller 13 controls the image capturing device so that the image capturing device captures the device selected in accordance with the user's input while the device is controlled or after the device is controlled, to allow the user to receive immediate feedback on how the device is being operated or controlled. For example, a voice input of "turn on the light" may be received from the user when the light is not located on the image. Then, the controller 13 controls the image capturing device so that it focuses on (e.g., pans, tilts, or zooms toward) the light to see the light is turned on or to see the light has been turned on.

Alternatively, when receiving the user's input, if the device selected in accordance with the user's input is not located in the currently displayed image, the display 12 may display the setting zone of the device on the image while the device is controlled or after the device is controlled, allowing the user to receive immediate feedback on how the device is being operated or controlled. It is possible to display the setting zone on the currently displayed image without the control of the image capturing device, so that the user may receive immediate feedback on how the device is being operated or controlled. For the above-described light, if a voice input of "turn on the light" from a user when the light or the setting zone of the light is not located in the image, the setting zone of the light may be displayed so that the user may monitor whether the light is turned on or has been turned on.

In order for the controller 13 to generate a control signal for controlling the device corresponding to the setting zone according to the touch input applied to the setting zone, the setting zone may be matched with the device. To this end, the mapper and the matcher may be used.

The mapper may map the coordinates of the setting zone designated by the user on the screen. The matcher may match the mapped coordinates of the setting zone to the indoor device to be controlled.

When the controller 13 generates a control signal for controlling the device matched in the matcher according to the touch input applied to the coordinates mapped in the mapper, the network may transmit the generated control signal to the indoor device. In addition, the network may receive the information of the indoor device from the indoor device.

The network may use wireless communications for data transmission with the indoor device. The wireless communications may include Wi-Fi, Bluetooth, ZigBee, Infrared Data Association (IrDA) and radio-frequency identification (RFID).

The information on the device received by the network may include the status information indicating an operating state of the device, measurement information indicating a value measured by the device, and image information captured by a camera mounted on the device. For example, if the device is a smart light bulb, the status information may include a light-off state, a light-on state, the color of the light, etc. If the device is an air conditioner, the measurement information may include room temperature, humidity, etc. measured by the air conditioner. When the device is a doorbell or an outdoor camera (e.g., closed-circuit television camera), the image information captured by a camera mounted on the doorbell or the outdoor camera may include a real-time image (e.g., still image, video footage) or recorded images.

The information display may indicate on the display 12 the status information, the measurement information, the image information and the guide information for operation of the device control system 1 received from the network. In addition, the information display may indicate on the display 12 the spatial information or the indoor environment information such as temperature and humidity measured by the camera in the image receiver 11.

The information display may collect the received measurement information of the indoor devices and indicate it on the display 12. For example, when the network receives the indoor temperature and the humidity from the air conditioner as the measurement information from an air cleaner, the information display may combine the received measurement information to indicate the indoor temperature, humidity and air quality on the display 12.

In addition, the information display may indicate the received status information of the device in the vicinity of the mapped coordinates of the setting zone matched with the device as an overlay view. For example, when the device is an air conditioner, the wind speed and direction information of the air conditioner may be indicated in the vicinity of the mapped coordinates of the setting zone matched with the air conditioner as an overlay view.

In addition, the information display may display, as the guide information required for the operation of the device control system 1, information on how to use the system, information for guiding the control menu of the indoor devices, etc.

The camera operator may control the operation of the camera. When the camera for capturing a real-time indoor image is a PTZ camera, the camera operator may control the operations of the PTZ camera such as panning, tilting and zooming. The camera operator may include a swivel, a gimbal, a slider, a motor, etc. The camera operator may include a function of individually controlling the panning, tilting and zooming of the PTZ camera, a function of controlling the PTZ camera so that it has predetermined values of the panning, tilting and zooming, and a function of restoring the PTZ camera to back to the initial state. For a 360-degree camera or a fish-eye camera, it is possible to control the devices for all directions without controlling the camera's operation.

When the indoor image captured by the camera changes by controlling the camera operation unit, the mapped coordinates do not change but the location of the matched device on the image changes, and thus the setting zone may be positioned at a location on the screen different from the location designated by the user. The mapping unit may adjust the mapped coordinates of the setting zone according to the movement of the camera so that the setting zone can be positioned at the location on the screen that the user has designated even if the indoor image captured by the camera is changed by the camera operation unit.

When the device selected upon receiving the input includes a display, the controller 13 may generate a control signal so that the selected device displays an image signal that the user desires to display on the display of the selected device upon receiving the user's input. When the device includes a display, such as a TV and a monitor, the controller 13 may control the device so that an image signal that the user desires is displayed on the display. If the image signal is a real-time image captured by a camera mounted on a user terminal or another capturing device or the like, video call with an object located indoors may be possible. In doing so, an audio signal together with the video signal may be sent out. Alternatively, images such as pictures and videos may be displayed.

When the device selected upon receiving the input is movable and the input interface 16 receives the location to which the selected device is to be moved, the controller 13 may generate a control signal for moving the selected device to the received location. By receiving the location to which the device is moved, which is movable or needs to be moved such as a robot cleaner (e.g., a robot vacuum cleaner) and an air cleaner (e.g., an air purifier), the device can be moved. In addition to the location to which the device is to be moved, the movement path may be input by a user via dragging (e.g., a tap and drag gesture) or the like.

The controller 13 may generate a control signal for simultaneously controlling a plurality of devices in the image upon receiving the input. It is possible to simultaneously control a plurality of devices with one input, such as entering a power saving mode in the user's absence from home (e.g., a vacation mode). For example, the devices which do not need to operate while nobody is present at home, such as a TV, an air conditioner and light may be turned off or may enter the power saving mode altogether.

In the foregoing description, the configuration of the device control system 1 according to the exemplary embodiment of the present disclosure has been described. Based on the above description, a method of operating the device control system 1 will be described below. In order to describe the method in detail, a smart light bulb will be described as an example of the indoor device. It is to be understood that the smart light bulb is merely an example and the indoor device controlled by the device control system 1 is not limited to the smart light bulb.

FIG. 3 shows a method of registering a setting zone for controlling a smart light bulb. In FIG. 3, the smart light bulb is an indoor device existing in the real-time indoor image displayed on the display 12.

The method of registering a setting zone for controlling the smart light bulb will be described with reference to FIG. 3. Initially, guide information 21 (e.g., instruction text) for guiding the user to designate a setting zone for controlling the smart light bulb is indicated by the information display. The guide information 21 may be located at the upper end of the display 12. The setting zone for selecting or controlling the smart light bulb may be set by performing object recognition. Alternatively, when the user makes a touch input 22 for designating the setting zone for controlling the smart light bulb according to the guide information 21, the input interface 16 receives the touch input and transmits it to the mapper. The setting zone may be a point on the screen where the smart light bulb is positioned. The mapper maps the coordinates of the setting zone 23 designated by the user on the screen. The matching unit receives the mapped coordinates of the setting zone 23 from the mapper and matches the received coordinates with the smart light bulb.

According to an exemplary embodiment of the present disclosure, the device control system 1 may control not only the indoor devices placed in the real-time indoor image but also indoor devices or outdoor devices located outside the real-time indoor image. A method of registering a setting zone to control an indoor device located outside a real-time indoor image will be described with reference to FIG. 4.

Figure 4:
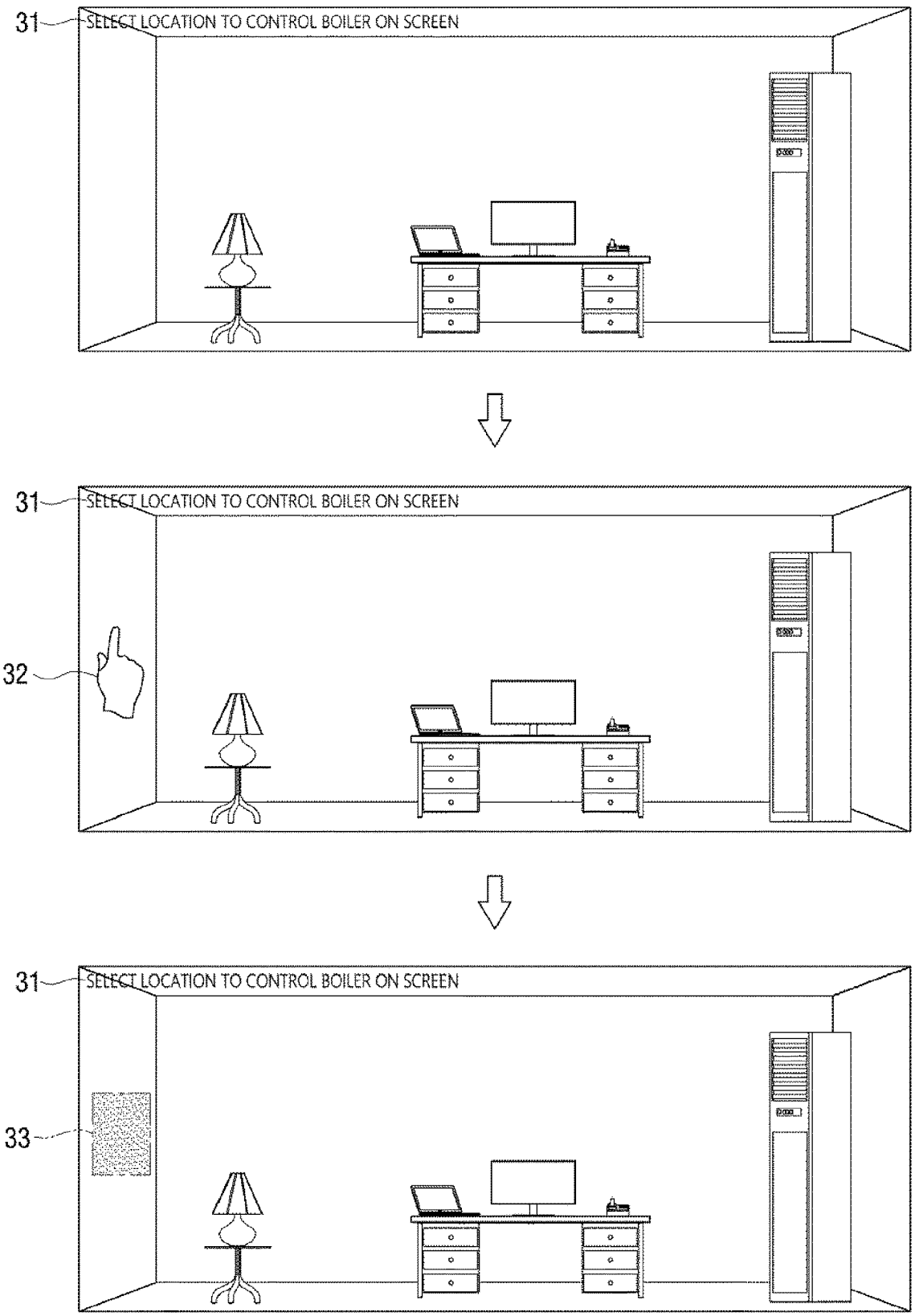
FIG. 4 shows a method of registering a setting zone for controlling a boiler.

FIG. 4 shows a method of registering a setting zone for controlling a boiler.

A method of registering a setting zone for controlling a boiler or a water heater that is placed outside the indoor image will be described with reference to FIG. 4. Initially, the information display indicates guide information 31 that guides registration of the setting zone for controlling the boiler. The user may touch an arbitrary area on the real-time indoor image displayed on the display 12 to designate the setting zone. In FIG. 4, the point where the left wall of the room is located in the real-time indoor image displayed on the display 12 is designated as the setting zone 33 by the user. The input interface 16 transmits a touch input 32 on the arbitrary setting zone 33 input by the user to the mapper, and the mapper maps the coordinates of the setting zone 33 on the touch screen 12. The matcher receives the coordinates of the setting zone 33 mapped from the mapper and matches the received coordinates with the boiler.

Figure 5:
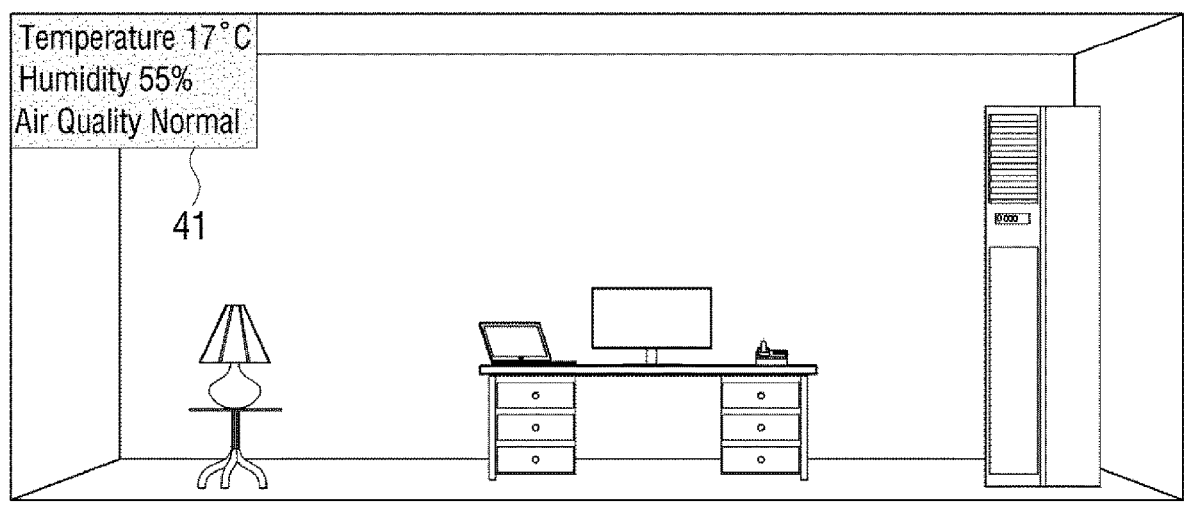
FIG. 5 shows the display in which measurement information is indicated.

Next, a method of indicating the measurement information on the indoor devices on the display 12 by the information display will be described with reference to FIG. 5. FIG. 5 shows the display 12 in which measurement information is indicated.

The network may receive measurement information on the temperature, humidity, air quality, etc. and the like in the room measured by the indoor devices such as an air conditioner, an air purifier, a humidifier and a thermometer, and may transmit the measurement information to the information display.

The information display may combine the pieces of the transmitted measurement information 41 and indicate it on the display 12. In doing so, the information display may display the measurement information 41 on the display 12 such that the measurement information does not overlap with the setting zone. In FIG. 5, the measurement information 41 may be located at the upper left portion of the screen so that it does not overlap with the setting zone.

In the example shown in FIG. 5, the information measured by the indoor devices is used as the measurement information indicated on the information display. If the camera that captures the indoor image has the capability of measuring temperature, humidity, air quality, etc., it is possible to receive the measurement information measured by the camera via the image receiver 11 and indicate it.

Hereinafter, a method of controlling an indoor device pursuant to a user's touch input will be described with reference to FIGS. 6 and 7.

Figure 7:
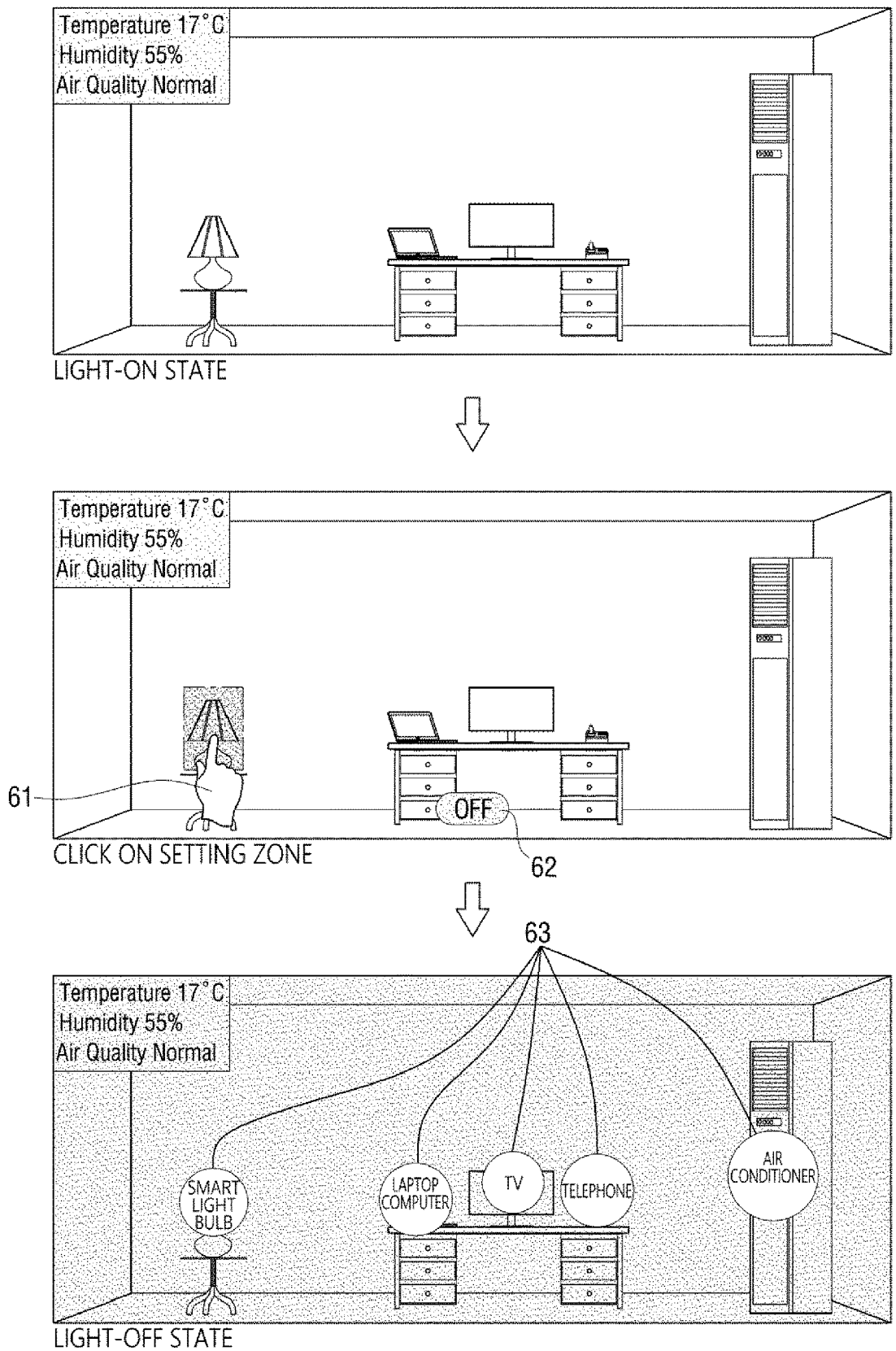

FIGS. 6 and 7 illustrate a method of controlling a smart light bulb when a user's touch input is a tap.

Referring to FIG. 6, the input interface 19 receives a touch input 52 of tapping the setting zone 51 of the smart light bulb from the user. The controller 13 receives the touch input from the touch screen 12 and receives from the network the status information indicative of the off-state of the smart light bulb. Since the touch input is a tap and the smart light bulb is in the off-state, the controller 13 may generate a control signal for switching the smart light bulb into the on-state. The controller 13 transmits the generated control signal to the device over the network, and accordingly the smart light bulb is switched into the on-state. In doing so, when the user taps the setting zone of the smart light bulb, the sign "ON" 53 may be displayed by the information display for a short period of time (e.g., flash) at the lower end of the display 12 as an indication that the smart light bulb is switched into the on-state.

Referring to FIG. 7, the input interface 19 receives a touch input 61 of tapping the setting zone of the smart light bulb from the user. The controller 13 receives the touch input from the touch screen 12 and receives from the network the status information indicative of the on-state of the smart light bulb. Since the touch input is a touch and the smart light bulb is in the on-state, the controller 13 may generate a control signal for switching the smart light bulb into the off-state. The controller 13 transmits the generated control signal to the device over the network, and accordingly the smart light bulb is switched into the off-state. Also in this time, in response to the input of clicking the setting zone of the smart light bulb on the display 12, the sign "OFF" 62 may be displayed by the information display for a short period of time (e.g., flash) at the lower end of the display 12 as an indication that the smart light bulb is switched into the off-state.

As the smart light bulb is switched into the off-state, the real-time indoor image displayed on the display 12 becomes dark, and thus it may be difficult to distinguish the locations of the indoor devices on the image one from another. In this regard, the information display may indicate information 63 (e.g., labels) on the devices matched with the mapped coordinates, so that the user can readily distinguish the devices one from another even in the dark image. The information on the indoor devices indicated by the information display includes the names of the devices, images of the devices, icons, etc.

Hereinafter, a method of controlling the smart light bulb precisely will be described with reference to FIG. 8.

Figure 8:
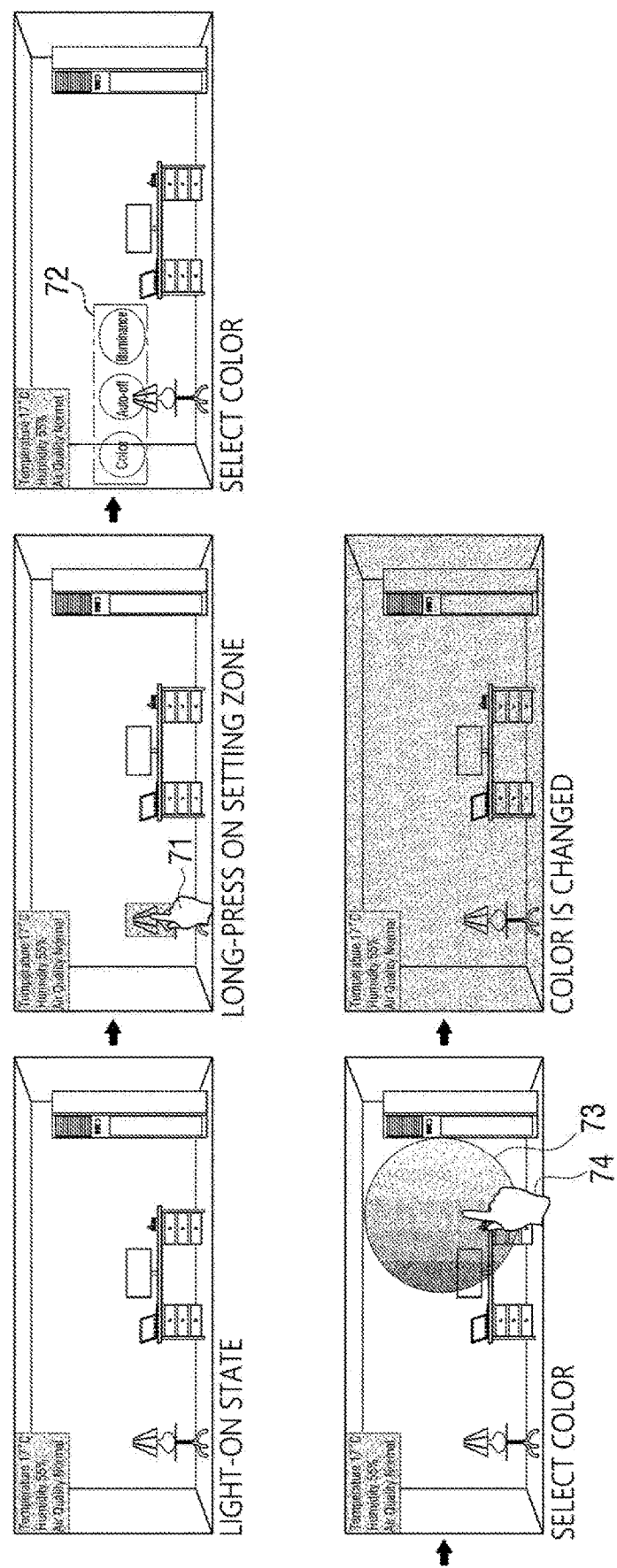
FIG. 8 shows a method of controlling the smart light bulb precisely.

FIG. 8 shows a method of controlling the smart light bulb precisely.

Referring to FIG. 8, before precise control, the smart light bulb is displayed on the display 12 in the on-state. The input interface 19 receives a long press gesture from a user with as a touch input 71 in the setting zone of the smart light bulb. The input interface 19 delivers the input of the long press gesture to the information display. The information display displays related control items 72 of the smart light bulb on the display 12 accordingly for finer control of the smart light bulb. The information display may indicate the related control items 72 in the vicinity of the coordinates to which the setting zone of the smart light bulb is mapped as an overlay view. The types of related control items 72 may vary depending on the type of the indoor devices. In FIG. 8, the related control items 72 of the smart light bulb includes the color, the auto-off and the illuminance. When the user taps on the color item among the related control items 72, the information display may display a color control panel 73 on the display 12 to adjust the color of the smart light bulb. When the user taps on a desired color on the color control panel 73, the controller 13 receives the touch input 74 of clicking from the input interface 19 and generates a control signal for changing the color of the smart light bulb according to the selected color. The generated control signal is transmitted to the smart light bulb over the network, and the color of the smart light bulb is changed accordingly. The user can receive immediate visual feedback on the color of the smart light bulb being changed via the real-time indoor image displayed on the display 12.

An image captured by another camera may be connected to the currently displayed image. By doing so, it is possible to quickly monitor an event that occurs on a single screen to control it, without having to switch the screen to the image captured by another camera or to divide the screen into sub-images captured by several cameras. A doorbell camera may be employed as an example of another camera that connects the images.

Figure 9:
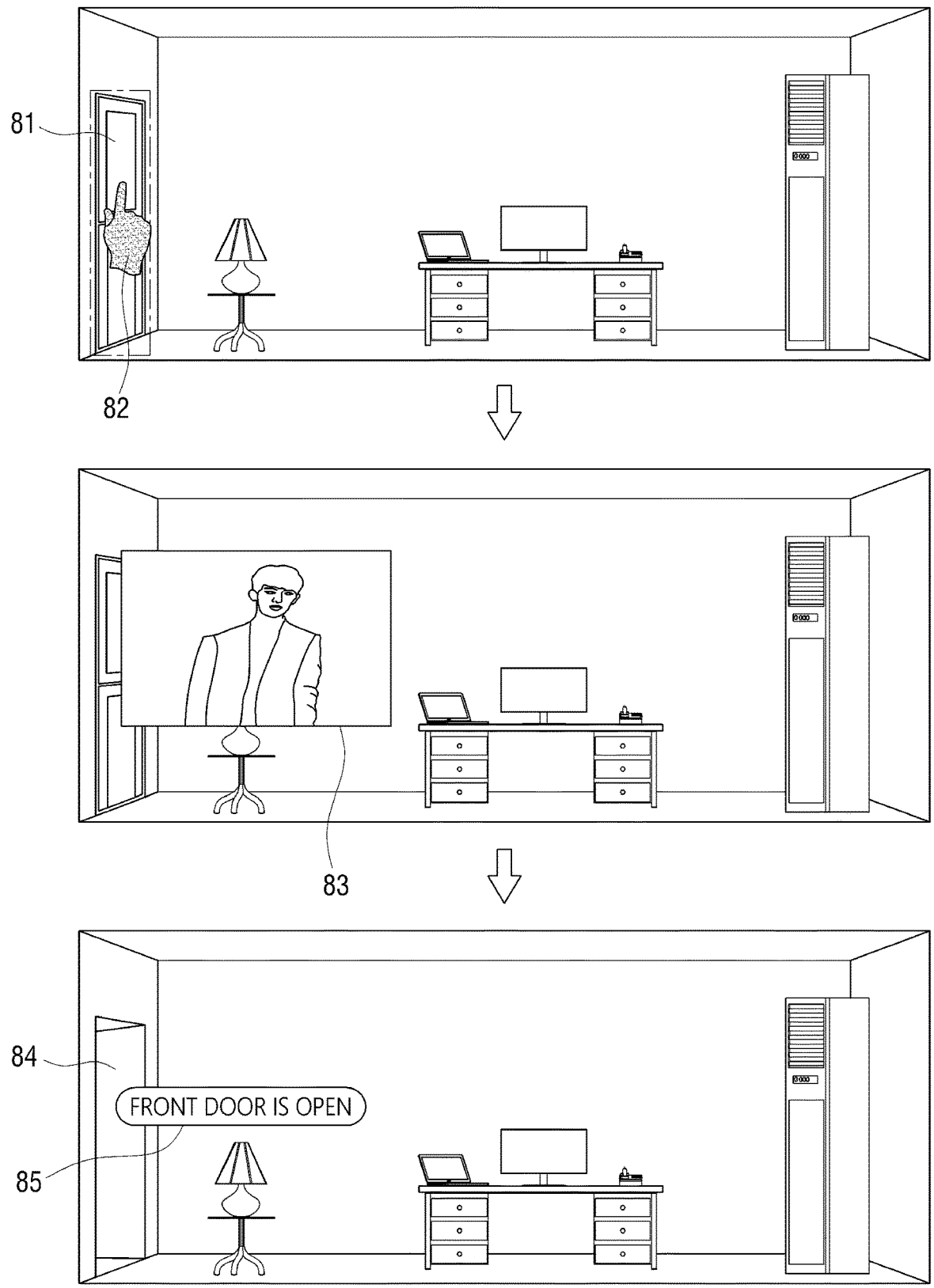
FIGS. 9 and 10 show a method of controlling a doorbell camera.

Referring to FIG. 9, the doorbell camera is located outdoors. The setting zone of the doorbell camera in the image may be set as a main door or a front door 81 that leads to the outside. Any other area may also be set as the setting zone. In order to register the doorbell camera and to set the setting zone of the doorbell camera, the user may touch the screen or draw a shaped around a desired setting zone, and then the setting zone is saved. The setting zone may be selected later on to retrieve the functions associated with the doorbell camera. In addition to the way that the user designates the area on the screen manually, the location of the setting zone of the doorbell camera may be recommended to the user by performing object recognition which automatically recognizes an object (e.g., a door) displayed on the image.

When the input interface 19 receives the touch input 82 for selecting the setting zone 81 of the doorbell camera from the user, an outside image 83 captured by the doorbell camera received from the doorbell camera may be displayed on the display 12. Even if there is no input from the user, the image of the doorbell camera may be displayed on the display 12 when information indicative of an event is received from the doorbell camera. Upon receiving an input to open the door lock from the user later on, the door lock 84 may be opened, and the information 85 may be displayed on the display.

Figure 10:
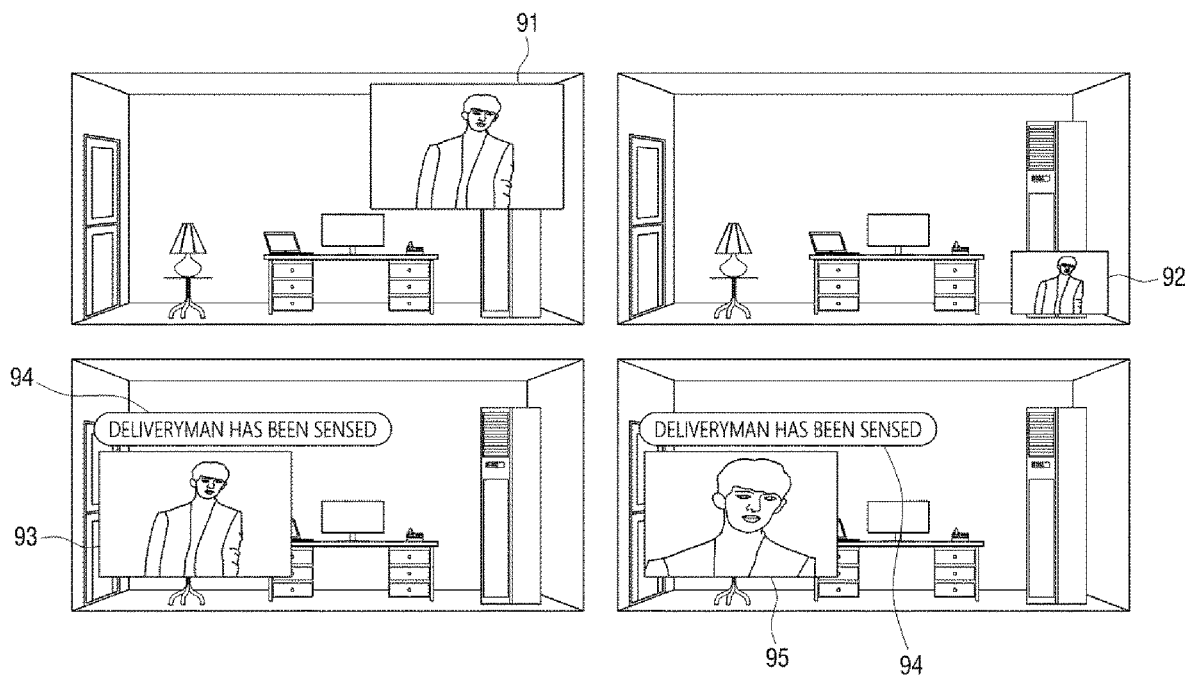

As shown in FIG. 10, the image of the doorbell camera may be moved to a desired location 91 or the size of the image of the doorbell camera may be adjusted (92). In addition, while the image of the doorbell camera is displayed, the functions associated with the doorbell camera may be used. For example, zoom-in 93, zoom-out 95, face recognition 94, object recognition, pan & tilt, two-way calling, and the like are possible. When the function of the camera is used, the information may be displayed on the display. When the image of the doorbell camera is displayed, recorded and saved image as well as real-time image may be displayed.

Figure 11:
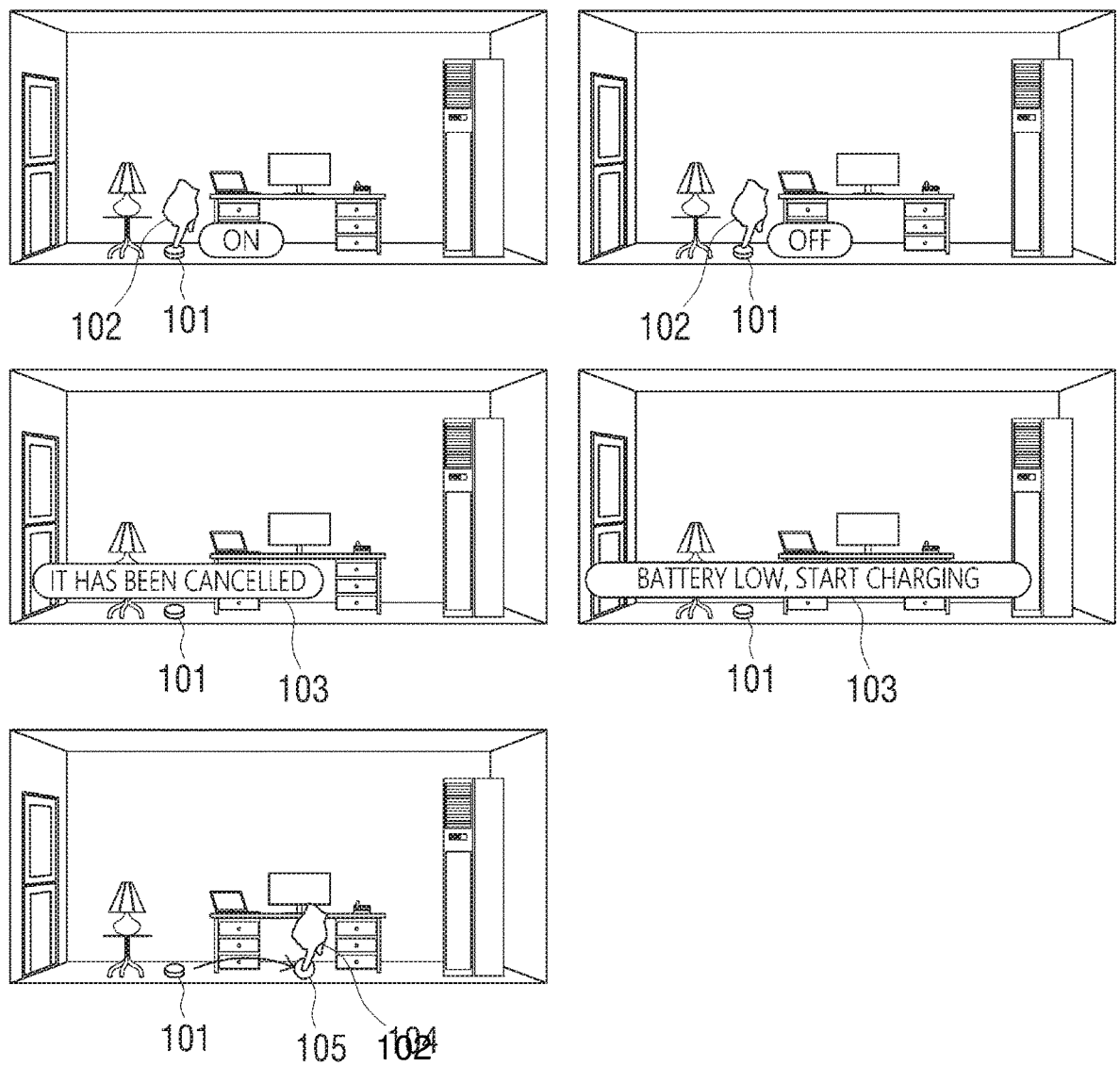
FIG. 11 shows a method of controlling a cleaning robot.

FIG. 11 shows a method of controlling a cleaning robot.

Referring to FIG. 11, the setting zone of a cleaning robot may be set to coincide with the location of the cleaning robot. An arbitrary area may be designated as the setting zone as the cleaning robot is a moving device.

When the input interface 19 receives a touch input 102 for selecting the setting zone 101 of the cleaning robot from the user, the operation of the cleaning robot may be executed or interrupted. When information is received from the cleaning robot, the information 103 may be displayed on the display 12. The information may include status information or measurement information. For example, information such as progress or completion of cleaning, battery status, filter status information and operation error may be displayed. In addition, it is possible to set a target point 105 by changing the direction of the cleaning robot, by receiving a location 104 to move, or by receiving a moving route. Further, information for locating the cleaning robot may be displayed on the display 12. In doing so, it is possible to accurately locate and guide the robot by using object recognition. Even if the cleaning robot is hidden behind another object and not visible in the image, the location of the cleaning robot may be determined by location tracking.

Figure 12:
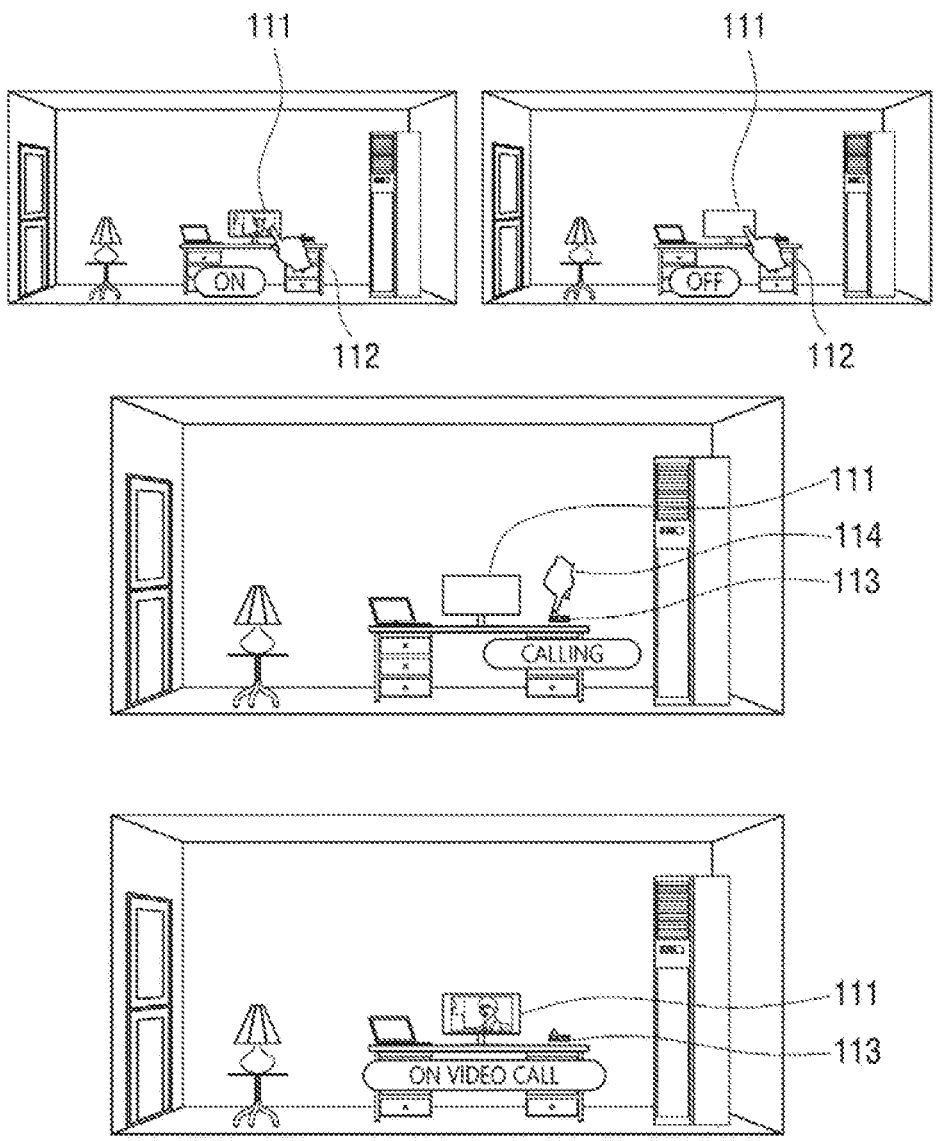
FIG. 12 shows a method of controlling a TV.

FIG. 12 shows a method of controlling a TV.

Referring to FIG. 12, when the input interface 19 receives a touch input 112 for selecting the setting zone 111 of a TV, it is possible to turn on/off the TV. In addition, it is possible to adjust the volume or change the channel, for example, by a dragging gesture.

When a user is outside and a dog is at home alone, the user may monitor where the dog is located from the image displayed on the display. In addition, the user may turn on the TV to provide entertainment for the dog or check the temperature/humidity of the house and adjust it in real time.

In addition, when the input interface 19 receives a touch input 114 for the user to select the setting zone 113 of a telephone, the user may make a phone call. At this time, if the TV is selected together with the telephone, a video call may be made through the TV. The information 115 indicating that the phone call and the video call are made may be displayed. The image captured by the user's mobile terminal may be transmitted to the TV so that bidirectional video communications may be performed. Video communications is possible using a device including a display other than the TV.

In addition to the indoor device controlled by the touch inputs of tap and long press gestures as described above, a plurality of indoor devices may be simultaneously controlled by a multi-touch input.

When a touch input of dragging down the screen from top to bottom with multiple fingertips is inputted, the controller 13 may generate a control signal for switching the plurality of indoor devices into the off-state by receiving the touch input from the input interface 19. Alternatively, when a touch input of dragging up the screen from bottom to top with multiple fingertips is inputted, the controller 13 may generate a control signal for switching the plurality of indoor devices into the on-state by receiving the touch input from the input interface 19.

The plurality of indoor devices may include all the devices matched with the coordinates mapped to the real-time indoor image displayed on the display 12. Alternatively, the plurality of indoor devices may be designated by the user in advance. The multi-touch gesture for controlling the indoor devices may be a touch input of touching the screen with three fingers.

FIG. 13 shows a method of adjusting the coordinates of the setting zone in accordance with the movement of the camera.

Referring to FIG. 13, when the camera pans to the left by the camera operation unit, the indoor image displayed on the display 12 changes according to the operation of the camera. On the contrary, the mapped coordinates 121 of the setting zone are the coordinates on the screen, and thus do not change with the movement of the camera. As a result, the mapped coordinates 121 of the setting zone may not match the location where the matched device is displayed.

In order to prevent such a situation, the location of the device may be recognized via object recognition, and the location of the setting zone may be set according to the location of the recognized device. Alternatively, the mapping unit may convert the mapped coordinates 121 to newly created coordinates 122 so that the mapped coordinates 121 of the setting zone are located on the matched device on the screen according to the movement of the camera. The setting zone may be located on the new coordinates 122, and the user may touch the setting zone on the new coordinates 122 to control the matched device.

In order to create the new coordinates 122 of the setting zone, the mapping unit analyzes the positional change of the matched device on the image before and after the movement of the camera by the image processing, to create the new coordinates 122 by moving the mapped coordinates 121 according to the changed location. Alternatively, the mapping unit may calculate the distance that the matched device has moved in accordance with the movement of the camera by using the moving angle of the camera and the distance between the camera and the matched device, to move the mapped coordinates 121 accordingly to create the new coordinates 122.

Figure 14:
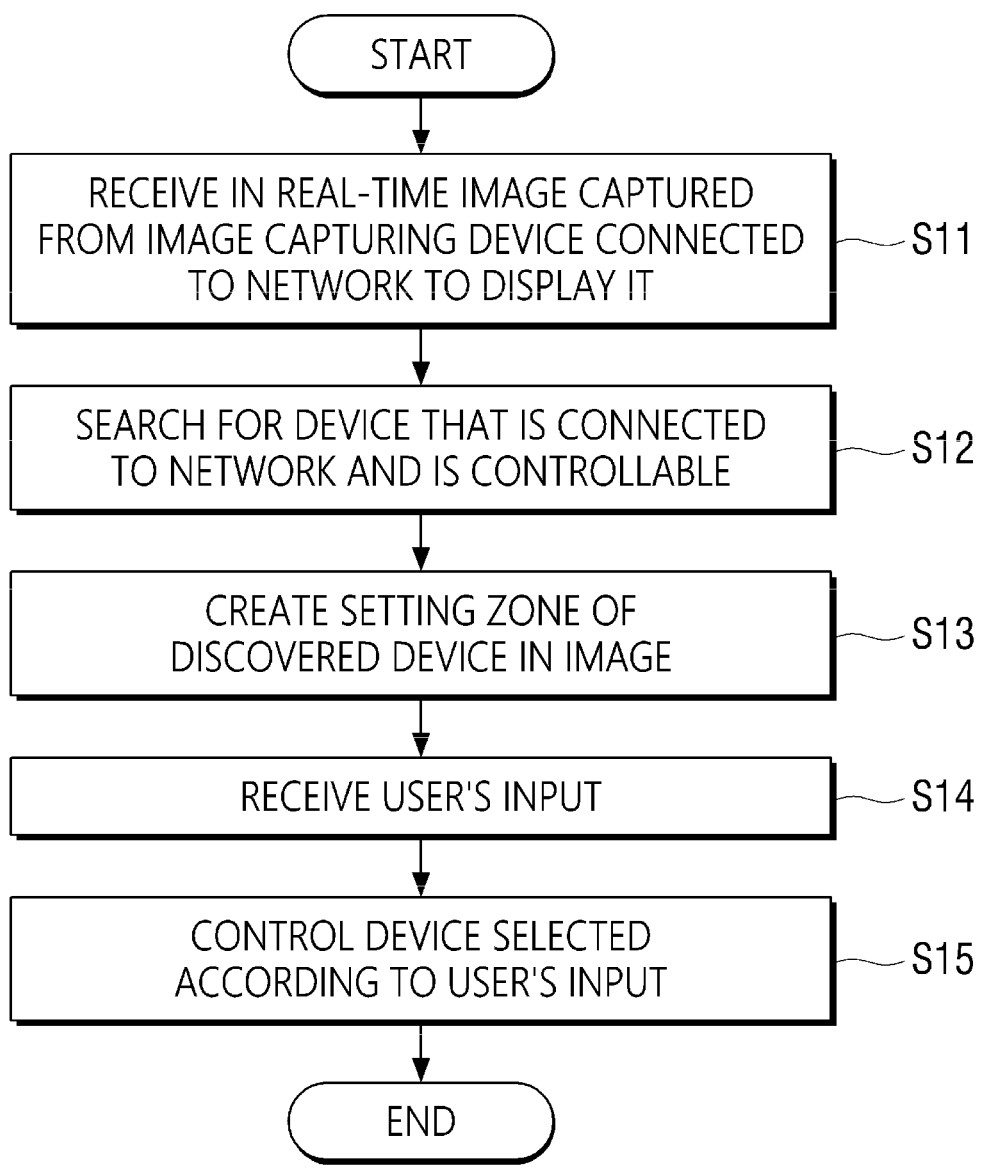
FIG. 14 is a flowchart for illustrating a method of controlling a device according to an exemplary embodiment of the present disclosure.
Figure 15:
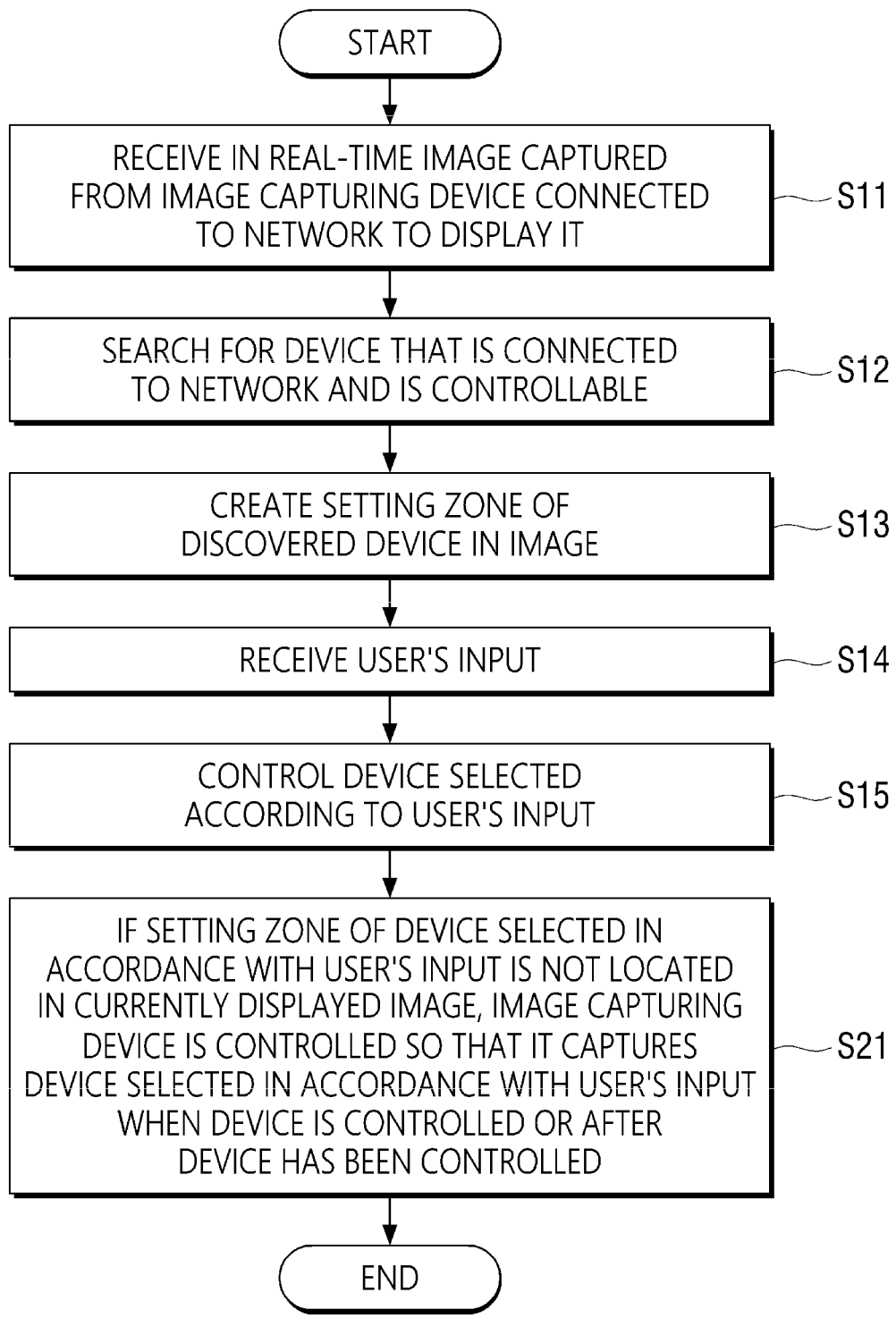
FIGS. 15 and 16 are flowcharts for illustrating a method of controlling a device according to an exemplary embodiment of the present disclosure.
Figure 16:
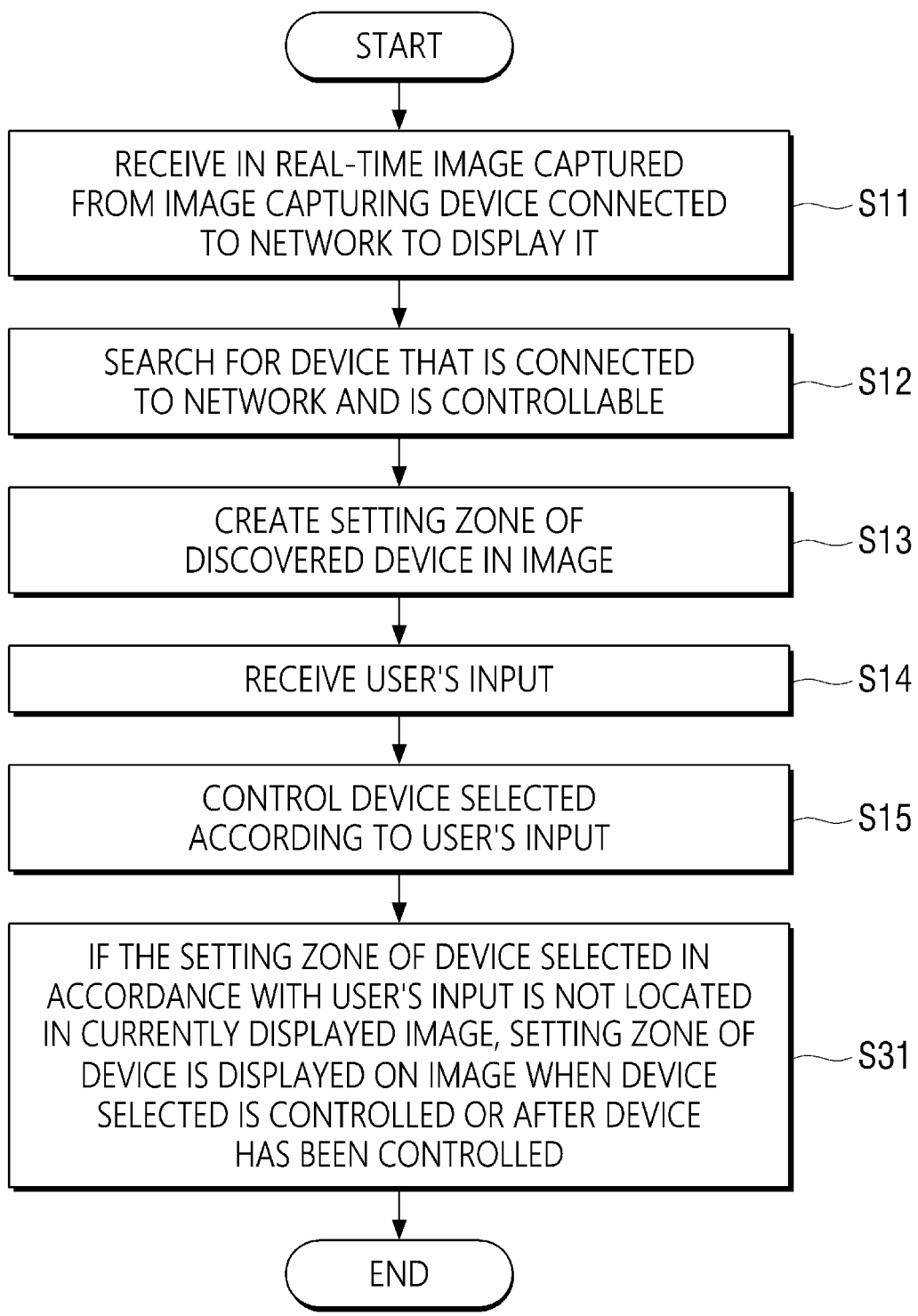

FIG. 14 is a flowchart for illustrating a method of controlling a device according to an exemplary embodiment of the present disclosure. FIGS. 15 and 16 are flowcharts for illustrating a method of controlling a device according to the exemplary embodiment of the present disclosure. The detailed description of the method corresponds to the detailed description of the device control system described above with reference to FIGS. 1 to 13; and, therefore, the redundant description will be omitted. It should be understood that, for any method or process discussed herein, there can be additional or alternative steps performed in similar or alternative orders, or in parallel, within the scope of the various embodiments unless otherwise stated.

In operation S11, an image captured by the image capturing device connected to the network is received and displayed in real time. In operation S12, a device which is connected to the network and is able to be controlled is searched for. In operation S13, a setting zone of the discovered device on the image is set. In operation S14, a user input is received. In operation S15, the selected device is controlled according to the user's input. The setting zone is changed according to the change of the image. The change of the image includes one of a change in the angle of view of the image or a change of the location of the device within a given angle of view.

The setting zone may be set upon receiving a user's input or by object recognition in an image. The method may further include displaying at least a part of the setting zone of the device selected upon receiving the user's input on the image.

The method may further include determining whether the discovered device is recognized (e.g., visible, featured, etc.) in the image. If it is determined that the device is recognized in the image, the setting the setting zone in the image may include setting the location in the image where the device is recognized as the setting zone of for the device. If it is determined that the device is not recognized in the image, the setting the setting zone in the image may include setting a predetermined location in the image that does not overlap with the setting zones of the other devices as the setting zone of the device.

If the device selected in accordance with the user input is not recognized in the currently displayed image, in operation S21, the image capturing device may be controlled so that it captures the device selected in accordance with the user's input while the device is controlled or after the device has been controlled. If the setting zone of the device selected in accordance with the user's input is not located in the currently displayed image, in operation S31, the setting zone of the device may be displayed on the image while the device selected is controlled or after the device has been controlled.

At least one piece of information on the device may be displayed on the setting zone. The user input may be a touch input or a voice input.

Exemplary embodiments of the present disclosure may be embodied in computer-readable code (e.g., instructions) on a computer-readable storage medium. A computer-readable storage medium may include any type of recording device in which data readable by a computer system is stored.

An example of the computer-readable storage medium may include a read-only memory (ROM), a random access memory (RAM), a compact disc read-only memory (CD-ROM), a magnetic tape, a floppy disk, an optical data storage, or the like. In addition, the computer-readable storage medium may be distributed in computer systems connected with one another over a network, such that the computer-readable code may be stored and executed in a distributed manner. Functional programs, codes and code segments for embodying the present disclosure may be easily deduced by computer programmers in the art.

It will be evident to those skilled in the art that various modifications and changes may be made in the exemplary embodiments of the present disclosure without departing from the technical idea or the gist of the present disclosure. Therefore, it should be understood that the above-mentioned embodiments are not limiting but illustrative in all aspects. It should be understood that the drawings and the detailed description are not intended to limit the present disclosure to the particular forms disclosed herein, but on the contrary, the intention is to cover all modifications, equivalents, and alternatives falling within the spirit and scope of the present disclosure as defined by the appended claims.

What is claimed is:

1. A method of controlling a device, the method comprising:
    receiving an image captured by an image capturing device connected to a network and displaying the image in real time on a touch screen;
    searching for the device that is connected to the network and determining whether the device is recognized in the image;
    in response to a determination that the device is recognized in the image, receiving a first user input and designating, within the image, a location of the device recognized in the image as a location of a setting zone of the device;
    in response to a determination that the device is not recognized in the image, designating a predetermined location on the image that does not overlap with locations of setting zones of other devices as the location of the setting zone of the device;
    receiving a second user input and generating a control signal for controlling the device via the image, when the second user input falls within the setting zone of the device in the image;
    controlling the device according to the second user input interacting with the setting zone of the device in the image; and
    updating the location of the setting zone of the device by changing the location of the setting zone of the device from the location designated by the first user to a different location within the image according to a change in the image in real time,
    wherein the change in the image comprises at least one of a change in an angle of view of the image of the image capturing device and a change in the location of the device within the angle of view of the image capturing device.

2. The method of claim 1, further comprising:
    displaying, on the image, at least a part of the setting zone of the device selected according to the first user input.

3. The method of claim 1, wherein the setting zone is designated based on at least one of the first user input and a result of object recognition within the image.

4. The method of claim 1, further comprising:
    based on the device selected according to the first user input not being recognized in the image, controlling the image capturing device to capture the device selected according to the first user input while the device is controlled or after the device has been controlled.

5. The method of claim 1, wherein information on the device is displayed on the setting zone.

6. The method of claim 1, wherein the first user input is one of a touch input and a voice input.

7. A device control system comprising:
    a camera connected to a network;
    a touch screen;
    an input interface;
    a processor; and
    a computer-readable storage medium storing instructions which, when executed by the processor, cause the processor to perform operations comprising:
        receiving an image captured by the camera in real time, controlling the display and displaying the image in real time on the touch screen,
        searching for a target device that is connected to the network and is separately provided from the camera
        determining whether the target device is recognized in the image,
        in response to a determination that the target device is recognized in the image, receiving a first user input and designating, within the image, a location of the target device recognized in the image as a location of a setting zone of the target device,
        in response to a determination that the target device is not recognized in the image, designating a predetermined location on the image that does not overlap with locations of setting zones of other devices as the location of the setting zone of the target device,
        receiving a second user input and generating a control signal for controlling the device via the image, when the second user input falls within the setting zone of the target device in the image, and
        controlling the target device according to the second user input interacting with the setting zone of the target device in the image, and,
        updating the location of the setting zone of the target device by changing the location of the setting zone of the target device from the location designated by the first user to a different location within the image according to a change in the image in real time,
        wherein the change in the image comprises at least one of a change in an angle of view of the image of the camera and a change in the location of the target device within the angle of view of the camera.

8. The device control system of claim 7, wherein the touch screen is configured to display, on the image, at least a part of the setting zone of the target device selected according to the first user input.

9. The device control system of claim 7, wherein the setting zone is designated based on at least one of the first user input and a result of object recognition within the image.

10. The device control system of claim 7, wherein the operations further comprise:
    based on the target device selected according to the first user input not being recognized in the image, controlling the camera to capture the target device selected according to the first user input while the target device is controlled or after the target device has been controlled.

11. The device control system of claim 7, wherein the touch screen is configured to display information on the target device is displayed on the setting zone.

12. The device control system of claim 7, wherein the first user input is one of a touch input and a voice input.

* * * * *